United States Patent
Than

(10) Patent No.: US 6,435,599 B2
(45) Date of Patent: Aug. 20, 2002

(54) DEVICE FOR TENSIONING SIDE TARPAULIN HAVING ABUTMENT ELEMENT SECURING TIGHTENER INDEPENDENT OF SIDE TARPAULIN TENSION

(75) Inventor: Johannes Than, Sundern-Endorf (DE)

(73) Assignee: Franz Miederhoff OHG, Sundern (DE)

( * ) Notice: Subject to any disclaimer, the term of this patent is extended or adjusted under 35 U.S.C. 154(b) by 0 days.

(21) Appl. No.: 09/853,248

(22) Filed: May 11, 2001

(30) Foreign Application Priority Data

May 18, 2000 (DE) .......................................... 100 24 623

(51) Int. Cl.$^7$ ................................................. B60J 7/00
(52) U.S. Cl. ............. 296/143; 296/100.15; 296/100.16; 296/98; 2/323; 24/68
(58) Field of Search ......................... 296/143, 98, 181, 296/183, 180.18, 100.12, 105, 138, 100.11, 83, 100.15, 100.16, 100.17; 2/323; 24/68, 302, 115 K

(56) References Cited

U.S. PATENT DOCUMENTS

| | | | | | |
|---|---|---|---|---|---|
| 3,672,004 | A | * | 6/1972 | Smith | ............................ 2/323 |
| 4,335,915 | A | * | 6/1982 | Knapp | ................... 296/100.16 |
| 4,493,133 | A | * | 1/1985 | Nilsson | ........................ 24/68 |
| 4,657,062 | A | * | 4/1987 | Tuerk | ................... 296/100.15 |
| 4,861,094 | A | * | 8/1989 | Krueger | ...................... 296/143 |
| 5,159,729 | A | * | 11/1992 | Walker | ........................ 24/302 |
| 5,950,284 | A | * | 9/1999 | Persson | ..................... 24/115 K |
| 6,193,299 | B1 | * | 2/2001 | Than | ..................... 296/100.15 |
| 6,234,562 | B1 | * | 5/2001 | Henning | ....................... 296/98 |
| 2001/0026076 | A1 | * | 10/2001 | Henning | ................ 296/100.16 |

FOREIGN PATENT DOCUMENTS

| | | | | |
|---|---|---|---|---|
| DE | 3501992 A1 | * | 7/1986 | |
| DE | 4415042 C1 | | 4/1995 | |
| DE | 29717590 U1 | * | 2/1998 | ........... B25B/25/00 |
| DE | 29919863 U1 | * | 2/2000 | ............. B60P/7/04 |
| DE | 19913616 A1 | * | 10/2000 | ............. B60P/7/04 |
| EP | 0081837 A2 | | 6/1983 | |
| EP | 0706908 A1 | * | 5/1995 | |
| FR | 2780686 | * | 7/1998 | |

* cited by examiner

*Primary Examiner*—Ken Patel
(74) *Attorney, Agent, or Firm*—Flanagan & Flanagan; John R. Flanagan

(57) ABSTRACT

A device for tensioning a side tarpaulin on a mounting structure, such as a vehicle superstructure, includes an abutment element attachable to the mounting structure, at least one side tarpaulin tightener separate from the abutment element being attachable to the side tarpaulin and swivelable into the abutment element to a closed position therein so as to apply a desired tension to the side tarpaulin, and a latch mechanism pivotally attached to the side tarpaulin tightener and engageable with the abutment element upon swiveling of the side tarpaulin tightener to the closed position for releasably securing the side tarpaulin tightener to the abutment element at the closed position and for retaining the side tarpaulin tightener at the closed position independent of the tension exerted on the side tarpaulin.

13 Claims, 2 Drawing Sheets

DEVICE FOR TENSIONING SIDE TARPAULIN HAVING ABUTMENT ELEMENT SECURING TIGHTENER INDEPENDENT OF SIDE TARPAULIN TENSION

BACKGROUND OF THE INVENTION

1. Field of the Invention

The present invention relates to a device for tensioning a side tarpaulin on a mounting structure, such as a vehicle superstructure, and, more particularly, is concerned with a side tarpaulin tensioning device having a tightener that will stay secured to an abutment element independent of the tension exerted on the side tarpaulin.

2. Description of the Prior Art

It is known to place and hold a side tarpaulin under tension on a vehicle superstructure by securing to an abutment element on the vehicle superstructure at least one side tarpaulin tightener being attached on a lower end of the side tarpaulin. One prior art device providing side tarpaulin tensioning in this way is disclosed in German patent document No. DE 44 15 042 C1. In the device of this German patent document, a lower edge of an outer frame of the vehicle superstructure serves as the abutment element for the tightener. The tightener itself is connected with the side tarpaulin via a belt which can be adjusted in length and is disposed on the outside of the side tarpaulin. The tightener includes a base element on which a hook is formed which, for tensioning the side tarpaulin, can be secured in position, for example, on the lower edge of the outer frame of the vehicle superstructure. The tightener also includes a tension lever pivotally articulated to the base element. By pivoting the tension lever from an open position to a closed position relative to the base element, the belt on the side tarpaulin and thus the side tarpaulin itself are placed under tension. The tightener further includes a latch pivotally mounted on the tension lever which is moved to a latched position behind a projection on the base element to retain the tension lever in its closed position. Other, overcenter type, tensioners are known in the prior art in which it is not necessary to provide additional latching in order to retain the tension lever in the closed position.

By extending the hook formed on the base element of the tightener behind the stationary abutment element on the vehicle superstructure and by applying tensile stress onto the side tarpaulin using the tension lever, the tightener is secured in the proper position on the stationary abutment element of the vehicle superstructure. Also, through the action of the applied tensile stress, the hook is retained in the proper position in which it extends behind the stationary abutment element.

A disadvantage of such type of side tarpaulin tightener is that upon a weakening of the tension force acting upon the side tarpaulin tightener in its closed position, due, for example; to the stretching of the side tarpaulin through temperature increase or also due to degradation, it cannot be ensured that the side tarpaulin tightener will remain in its proper position in which the hook on its base element extends behind the stationary abutment element. Analogous conditions can occur also if, for example, an upper stringer on which the side tarpaulin is retained at the top of the vehicle superstructure becomes deflected downwardly due to loading which can occur in particular when driving through tunnels. If the tension force acting upon such type of side tarpaulin tightener via the side tarpaulin weakens, the tightener can swivel out of its proper position such that its hook no longer extends behind the stationary abutment element and thus the tightener is no longer secured to the vehicle superstructure via the abutment element. The tightener at the lower end of the side tarpaulin then being unsecured may flap about and represent a considerable danger potential.

Another disadvantage of such type of side tarpaulin tightener is that in the open position of the tightener the hook formed on the base element of the tightener is disposed in alignment with the lower end of the outer frame of the vehicle superstructure serving as the stationary abutment element. In order for a side tarpaulin equipped with such side tarpaulin tighteners to be rolled upwardly, it is necessary to ensure that the tighteners are spaced apart from the stationary abutment element to the extent that the hooks are located outside of alignment with the stationary abutment element. Therefore, as a rule, for rolling up a side tarpaulin having such type of tighteners two persons are necessary, with one person actuating the roll-up device and the other person simultaneously pulling the side tarpaulin and the tighteners therewith away from the vehicle superstructure.

Consequently, there is a need for further development of a device of the above type for tensioning a side tarpaulin such that the aforementioned disadvantages are avoided.

SUMMARY OF THE INVENTION

The present invention overcomes the aforementioned problems of the prior art by providing a side tarpaulin tensioning device which avoids undesirable detaching of a tightener of the device from a stationary abutment element of the device mounted on the vehicle superstructure and further avoids unintentional catching of the tightener on the stationary abutment element during roll-up of the side tarpaulin.

Accordingly, the present invention is directed to a device for tensioning a side tarpaulin on a mounting structure, such as a vehicle superstructure, which comprises an abutment element attachable to the mounting structure, at least one side tarpaulin tightener separate from the abutment element being attachable to the side tarpaulin and swivelable into the abutment element to a closed position therein so as to serve as a tension lever to apply a desired tension to the side tarpaulin, and a latch mechanism pivotally attached to the side tarpaulin tightener and engageable with the abutment element upon swiveling of the side tarpaulin tightener to the closed position for releasably securing the tightener to the abutment element at the closed position and retaining the tightener at the closed position independent of the tension exerted on the side tarpaulin.

The abutment element of the device is attachable stationarily on the mounting structure and has spaced apart upper and lower portions. The upper portion of the abutment element defines a slide-in pocket open in a downward direction. The lower portion of the abutment element defines a latching edge. The abutment element between the slide-in pocket of the upper portion and the latching edge of the lower portion defines a stop which acts to prevent movement of the side tarpaulin tightener in the downward direction once the tightener is placed in the abutment element at the closed position.

The side tarpaulin tightener of the device includes a base element having spaced apart upper and lower portions and therebetween being adapted for connection to a lower end portion of the side tarpaulin. The upper portion of the base element defines a slide-in section for sliding into the slide-in pocket of the abutment element after which the base element can be swiveled toward the abutment element so as to serve as a tension lever that applies the desired tension to the side tarpaulin and so as to removably place the lower portion of the base element upon the stop of the abutment element such that the base element of the tightener is removably received into the abutment element between the slide-in pocket and the stop thereof.

The latch mechanism of the device includes a closure lever pivotally articulated to the lower portion of the base element and a closure hook attached to the closure lever for undergoing movement therewith. The latch mechanism also includes means for biasing the closure lever and thus the closure hook to move from an unlatched position located away from the latching edge of the lower portion of the base element to a latched position located behind the latching edge so as to secure the base element of the tightener to the abutment element irrespective or independent of the tension applied on the side tarpaulin.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
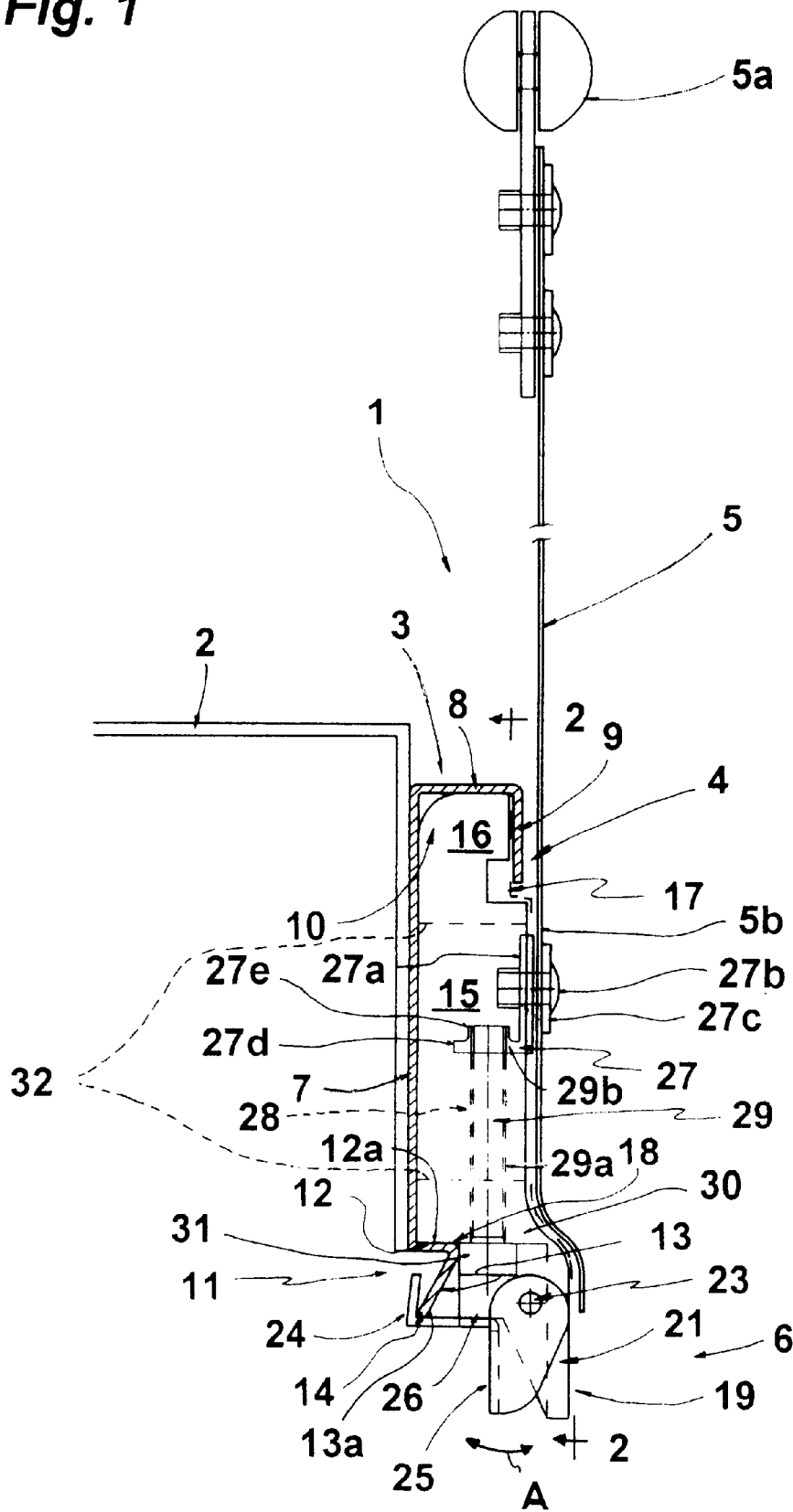
FIG. 1 is a longitudinal cross-sectional view of a side tarpaulin tensioning device of the present invention showing a side tarpaulin tightener of the device secured in a stationary abutment element of the device.
Figure 2:
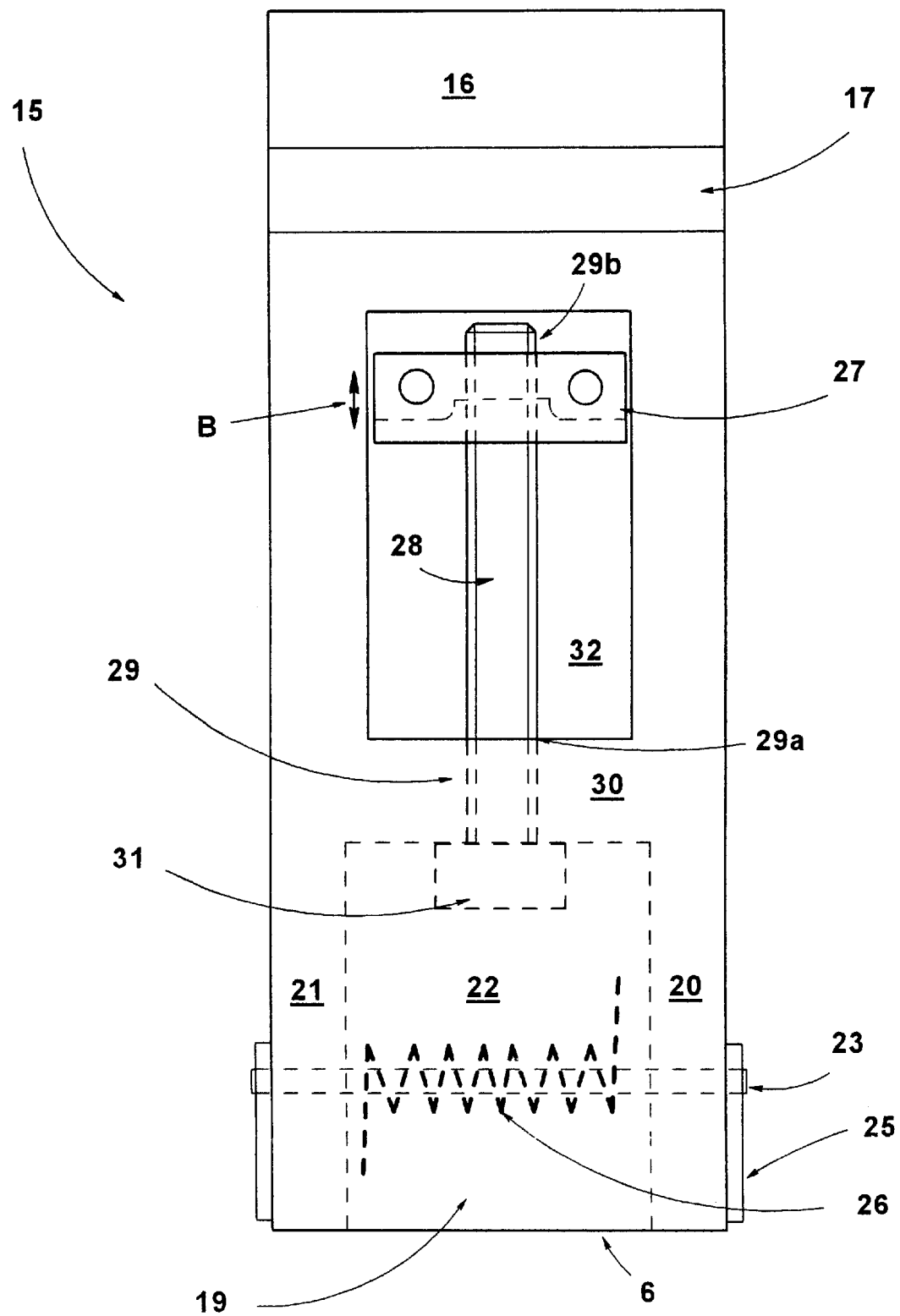
FIG. 2 is an enlarged front elevational view of the side tarpaulin tightener of the device as seen along line 2—2 of FIG. 1.

Referring to the drawings and particularly to FIG. 1, there is illustrated a device of the present invention, generally designated 1, for tensioning a side tarpaulin 5 on a mounting structure 2, such as a vehicle superstructure. Basically, the side tarpaulin tensioning device 1 includes a profile or abutment element 3 attachable to the mounting structure 2, at least one side tarpaulin tightener 4 separate from the abutment element 3, being attachable to the side tarpaulin and swivelable into the abutment element 3 to a closed position therein, as seen in FIG. 1, so as to serve as a tension lever to apply, a desired tension to the side tarpaulin 5, and a latch mechanism 6 pivotally attached to the side tarpaulin tightener 4 and engageable with the abutment element 3 upon swiveling of the side tarpaulin tightener 4 to the closed position for releasably securing the side tarpaulin tightener 4 at the closed position relative to the abutment element 3 and for retaining the side tarpaulin tightener 4 at the closed position independent of the tension exerted on the side tarpaulin 5. In FIGS. 1 and 2 only one side tarpaulin tightener 4 is shown, although normally a plurality thereof would be employed.

The abutment element 3 of the device 1 is stationarily attachable in any suitable manner on an exterior vertically extending portion of the mounting structure 2, which, for example, may be an outer frame of the vehicle superstructure (otherwise not depicted in detail in FIG. 1). The abutment element 3 serves for housing the side tarpaulin tightener 4, being associated with the vehicle side shown in FIG. 1, when the side tarpaulin tightener 4 is at the closed position. The side tarpaulin tightener 4 of the device 1 is disposed in the proximity of the lower end of the side tarpaulin 5, at whose upper end are disposed several rollers 5a. The rollers 5a are guided in a guide rail (not shown) on the vehicle superstructure for topside retention of the side tarpaulin 5.

The profile or abutment element 3, being disposed on the exterior vertically extending portion of the outer frame or mounting structure 2, includes a contact or main shank 7 in contact on and attachable in any suitable manner to the vertically extending portion of the mounting structure 2, and an upper shank structure comprised of an upper horizontal shank 8 which extends substantially horizontally outward from the contact shank 7, adjoining the contact shank 7 at an upper end thereof, and an upper outer limit shank 9, delimiting the upper horizontal shank 8 at the outer end thereof and projecting vertically downward relative thereto. An upper portion of the abutment element 3 defined by an upper section of the contact shank 7, the upper horizontal shank 8 and the upper outer limit shank 9, forms a slide-in pocket 10 which opens in the downward direction.

The profile or abutment element 3 also includes a lower shank structure 11 having an asymmetric V-shaped configuration which delimits the lower end of the contact shank 7. The lower shank structure 11 is comprised of a lower horizontal shank 12 which extends substantially horizontally outward from the contact shank 7, adjoining the contact shank 7 at the lower end thereof, and a lower outer shank 13, delimiting the lower horizontal shank 12 at an outer end thereof and projecting downwardly and inwardly, obliquely toward the mounting structure 2 and under the lower horizontal shank 12 so as to form a ramp-like face. An lower portion of the abutment element 3 defined by the lower horizontal shank. 12 and the lower outer shank 13 spaced therebelow respectively having an upper face 12a directed upwardly toward the slide-in pocket 10 and forming a stop and a lower face 13a directed outwardly and downwardly in an oblique orientation relative to the main or contact shank 7 such that a latching edge 14 defined by a lower edge of the lower outer shank 13 terminates the lower face 13a. The upwardly facing upper face 12a of the lower horizontal shank 12 forming the stop acts to prevent movement of the side tarpaulin tightener 4 in the downward direction once the tightener 4 is swiveled to the closed position into the abutment element 3.

The side tarpaulin tightener 4 includes a base element 15 having spaced apart upper and lower portions and therebetween being adapted for connection to a lower end portion 5b of the side tarpaulin 5. The upper portion of the base element 15 defines a slide-in section 16 for sliding into the slide-in pocket 10 of the abutment element 3. After the slide-in section 16 of its upper portion is inserted into the slide-in pocket 10 of the upper end of the abutment element 3, the base element 15 projects outwardly from the abutment element 3. With the upper portion of the base element 15 retained in the upper portion of the abutment element 3, then by swiveling the base element 15 along an arcuate path from the outward position toward the abutment element 3, the base element 15 serves as a tension lever that applies a desired tension to the side tarpaulin 5. Such swiveling also removably places the base element 15 at the lower portion thereof upon the upper stop face 12a of the abutment element 3 such that the base element 15 of the side tarpaulin tightener 4 is removably received between the slide-in pocket 10 and the stop surface 12a of the abutment element 3. The upper portion of the base element 15 of the side tarpaulin tightener 4 also has an outwardly opening slot 17 defined therein adjacent to the slide-in section 16 into which is extendable the upper outer limit shank 9 of the abutment element 3 to enable the sliding of the slide-in section 16 of the base element 15 into the slide-in pocket 10 followed by the swiveling of the base element 15 relative to the abutment element 3. The slide-in pocket 10 of the abutment element 3 has a width only slightly larger than the width of the slide-in section 16 of the base element 15 of side tarpaulin tightener 4 such that the slide-in section 16, when received in the slide-in pocket 10, substantially occupies the width of the slide-in pocket 10 and the base element 15 of the side tarpaulin tightener 4 thereby is contained in the abutment element 3 in the closed tensioned position largely free of play between the slide-in pocket 10 of the upper portion and the stop of the lower portion of the abutment element 3. The lower portion of the base element 15 has a step 18 which serves as a counterstop and cooperates with the stop face 12a of the abutment element 3 to limit or prevent the vertical movement of the side tarpaulin tightener 4 relative to the abutment element 3. Furthermore, the lower portion of the base element 15 has a handle 19 which can be readily gripped by an operator to use the base element 15 as the tension lever. More specifically, the handle 19 is formed by a pair of opposite end jaws 20, 21 on the base element 15 which at the outer sides thereof are interconnected by a cover plate 22.

Referring to FIGS. 1 and 2, the latch mechanism 6 of the device 1 includes a closure hook 24 and a closure lever 25. The closure lever 25 is pivotally articulated to the lower portion of the base element 15 and the closure hook 24 is attached to the closure lever 25 for undergoing movement therewith. The latch mechanism 6 also includes means in the form of spring 26 for biasing the closure lever 25 and thus the closure hook 24 to move from an unlatched position away from the latching edge 14 of the lower portion of the base element 15 to a latched position, as seen in FIG. 1, where an outer end portion of the closure hook 24 is located behind the latching edge 14 of the abutment element 3. The jaws 20, 21 of the handle 19 serve for supporting a pivot axle 23 by which the closure lever 25, acted upon by the spring 26, is connected to and pivotally articulated with respect to the lower portion of the base element 15 of the side tarpaulin tightener 4, The closure lever 25 may be employed by the operator to actuate (latch and unlatch) the closure hook 24. Also, the closure hook 24, due to contact with the obliquely-oriented ramp-like lower face 13a of the lower outer shank 13, is capable of automatically being moved and snapped into the latched position with the latching edge 14 of the abutment element 3 solely by the operator gripping the handle 19 and swiveling the base element 15 into the closed tensioned position in the alignment element 3. The closure hook 24 is held by the biasing spring 26 in the latched position shown in FIG. 1. In such position an inner portion of the closure hook 24 adjacent to the closure lever 25 is adjacent to a stop surface on the lower portion of the base element 15 such that even in the open condition of the side tarpaulin tightener 4 the closure hook 24 is disposed in the position shown in FIG. 1 with respect to the base element 15. The swivel movement of the closure hook and lever 24, 25 is indicated by an arrow A. It can be readily seen that the side tarpaulin tightener 4 is secured and retained in its tensioned or closed position in the abutment element 3, irrespective or independent of the tension applied on the side tarpaulin 5, due to lack of play between the base element 15 and the upper and lower portions of the abutment element 3 and further due to the closure hook 24 of the latch mechanism 6 being in its latched position extending behind the latching edge 14 of the stationary abutment element 3.

The side tarpaulin 5 is connected to the side tarpaulin tightener 4 via any suitable means, for example, a fastening angle element 27. The fastening angle element 27 has one shank portion, 27a facing toward and in contact with an interior surface of the side tarpaulin 5. The one shank portion 27a is suitably fastened onto the tarpaulin such as by a rivet connection 27b employing a counter plate 27c. Another shank portion 27d rigidly connected to and extending transversely from the one shank portion 27a extends away from the side tarpaulin 5 and defines a threaded bore 27e which is engaged by an adjustment member 28 in the form of a bolt 29 having a shaft 29a provided with outer threads 29b at one end. The bolt 29 is rotatably supported in a web 30 of the base element 15 and has a head 31 fixed on the other end of the shaft of the bolt 29. A guide recess 32 is formed in the base element 15 and the one shank portion 27a of the fastening angle element 27 is guided therein in the directions of arrow B through the turning and thus actuation of the adjustment member 28. The fastening angle element 27 can be moved within the guide recess 32 in one or the other direction such that in this way the adjustment of the side tarpaulin tightener 4 is possible in the vertical direction with respect to the side tarpaulin 5. In such manner the amount of tension that will be applied on the side tarpaulin 5 by the swiveling of the tightener 4 can be initially preselected.

It is useful to dispose the side tarpaulin tightener 4 on the inside or interiorly of the side tarpaulin 5 such that, not only is the loading area of the vehicle expanded by the particular depth of the tightener 4 but also the full height of the outside of the side tarpaulin 5 is now available for imprinting. Also, by fastening the side tarpaulin tightener 4 on the inside, the development of folds as occur in the prior art in the lower end region of the tarpaulin during the tensioning of the same is avoided. The side tarpaulin tightener 4 is also covered by the side tarpaulin 5 such that, due to the smooth outer termination of the vehicle superstructure, not only the visual appearance is improved, but also the danger potential is reduced which otherwise arises where the side tarpaulin tightener is disposed on the outside of the side tarpaulin 5. The lower end location of the handle 19 and the latch mechanism 6 on the side tarpaulin tightener 4 allows for easy actuation of the tightener 4 even though most of its length is covered by the side tarpaulin 5, as readily seen in FIG. 1.

Further, with respect to the latch mechanism 6, the side of its closure hook 24 facing toward the mounting structure 2, such as the vehicle superstructure, is advantageously disposed in approximately the same plane as defined by the rear side of the base element 15 which makes contact with the contact shank 7 of the abutment element 3. This generally coplanar relationship ensures that, after the side tarpaulin tightener 4 has been detached and its base element 15 removed away from the abutment element 3, the base element 15 can be moved upward past the upper outer limit shank 9 without danger than the closure hook 24 will become hooked on the underside of the limit shank 9 when the side tarpaulin 5 is being rolled up and thus would hinder the rolling movement.

It can be readily understood that the employment of the device 1 of the present invention, as described above and depicted in FIGS. 1 and 2, facilitates a side tarpaulin tensioning system in which the side tarpaulin tightener 4, independently of the tensile stress exerted onto and existing within the side tarpaulin 5, is held securely on the abutment element 3 attached to the mounting structure 2 of the vehicle such that the system is suitable, in particular, for application with such vehicle superstructures which are exposed to high loading, since the danger of undesirable detaching of the side tarpaulin tightener 4 from the vehicle superstructure 2 is eliminated. Such system also will meet the especially high requirements that are imposed on such systems where the vehicle superstructures are used as containers or in piggyback transport on railroads in tunnel traffic.

Further, the base element 15 of the side tarpaulin tightener 4 may be produced of a solid material, usefully of a synthetic material block, such that the side tarpaulin tightener 4 when disposed on the side of the vehicle superstructure can additionally serve as a protection against ramming.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A device for tensioning a side tarpaulin on a mounting structure, said device comprising:

(a) an abutment element attachable to the mounting structure;

(b) at least one side tarpaulin tightener separate from said abutment element, being attachable to the side tarpaulin and swivelable into said abutment element to a closed position therein so as to serve as a tension lever to apply a desired tension to said side tarpaulin; and (c) a latch mechanism pivotally attached to said side tarpaulin tightener and engageable with said abutment element upon swiveling of said side tarpaulin tightener to said closed position for releasably securing said side tarpaulin tightener to said abutment element at said closed position and for retaining said side tarpaulin tightener at said closed position independent of the tension exerted on the side tarpaulin;

(d) wherein said abutment element is attachable stationarily on the mounting structure and has spaced apart upper and lower portions, said upper portion defining a slide-in pocket open in a downward direction, said lower portion defining a latching edge, said abutment element between said slide-in pocket of said upper portion and said latching edge of said lower portion defining a stop which acts to prevent movement of said side tarpaulin tightener in the downward direction once said tightener is placed in said abutment element at said closed position.

2. The device of claim 1 wherein said side trapaulin tightener includes a base element having spaced apart upper and lower portions and therebetween being adapted for connection to a lower end portion of the side tarpaulin, said upper portion of said base element defining a slide-in section for sliding into said slide-in pocket of said abutment element after which said base element can be swiveled toward said abutment element so as to serve as a tension lever that applies a desired tension to the side tarpaulin and so as to removably place said lower portion of said base element upon said stop of said abutment element such that said base element of said tightener is removably received in said abutment element between said slide-in pocket and said stop thereof.

3. The device of claim 2 wherein said upper portion of said base element of said tightener also has an outwardly opening slot defined therein adjacent to said slide-in section and into which is extendable an edge of said upper portion of said abutment element to enable the sliding of said slide-in section of said base element into said slide-in pocket and the swiveling of said base element of said tightener relative to said abutment element.

4. The device of claim 2 wherein said abutment element has a vertically extending main shank attachable to the vehicle superstructure and an upper shank attached to and extending outwardly and downwardly from said main shank so as to form said slide-in pocket therewith.

5. The device of claim 4 wherein said upper portion of said base element of said tightener also has an outwardly opening slot defined therein adjacent to said slide-in section and into which is extendable an edge of said upper shank of said abutment element to enable the sliding of said slide-in section of said base element into said slide-in pocket and the swiveling of said base element of said tightener relative to said abutment element.

6. The device of claim 4 wherein said lower portion of said abutment element has a lower shank attached to and extending outwardly and downwardly from said main shank so as to form said stop and said latching edge spaced below said stop and defined by a lower edge of said lower shank.

7. The device of claim 6 wherein said lower shank has an upper face directed upwardly toward said slide-in pocket and forming said stop and a lower face directed outwardly and downwardly in an inclined orientation relative to the main shank such that said latching edge is defined by said lower edge of said lower shank that terminates said lower face.

8. The device as claimed in claim 2 wherein said slide-in pocket of said abutment element and said slide-in section of said base element of said tightener have respective widths which correspond to one another such that said slide-in section of said base element of said tightener when received in said slide-in pocket of said abutment element substantially occupies the width of said slide-in pocket of said abutment element.

9. The device of claim 2 wherein said latch mechanism includes:

a closure lever pivotally articulated to said lower portion of said base element;

a closure hook attached to said closure lever for undergoing movement therewith; and means for biasing said closure lever and thus said closure hook to move from an unlatched position located away from said latching edge of said lower portion of said base element to a latched position located behind said latching edge so as to secure said base element of said tightener to said abutment element independent of the tension applied on the side tarpaulin.

10. The device of claim 9 wherein said base element of said tightener has a back wall defining a plane and extending between and interconnecting said upper and lower portions and said closure hook of said latch mechanism is disposed along said plane defined by said back wall of said base element such that both said base element and said closure hook are disposed exteriorly of said abutment element when said base element is removed from said abutment element.

11. The device of claim 2 wherein said side tarpaulin tightener further includes an adjustment member supported on said base element of said tightener and engaged with the side tarpaulin and being adjustable to allow change of the tension applied to the side tarpaulin by said tightener when said base element, serving as a tension lever that applies tension to the side tarpaulin, is swiveled toward said abutment element.

12. The device of claim 11 wherein said side tarpaulin tightener includes an fastening angle element connecting said adjustment member to the side tarpaulin and guided in a recess formed in said base element between said upper and lower portions thereof.

13. A device for tensioning a side tarpaulin on a mounting structure, said device comprising:

(a) an abutment-element attachable to the mounting structure;

(b) at least one side tarpaulin tightener separate from said abutment element, being attachable to the side tarpaulin and swivelable into said abutment element to a closed position therein so as to serve as a tension lever to apply a desired tension to said side tarpaulin; and (c) a latch mechanism pivotally attached to said side tarpaulin tightener and engageable with said abutment element upon swiveling of said side tarpaulin tightener to said closed position for releasably securing said side tarpaulin tightener to said abutment element at said closed position and for retaining said side tarpaulin tightener at said closed position independent of the tension exerted on the side tarpaulin;

(d) wherein said side tarpaulin tightener is adapted to be fastened on an interior side of the side tarpaulin.

* * * * *